Figure 1:
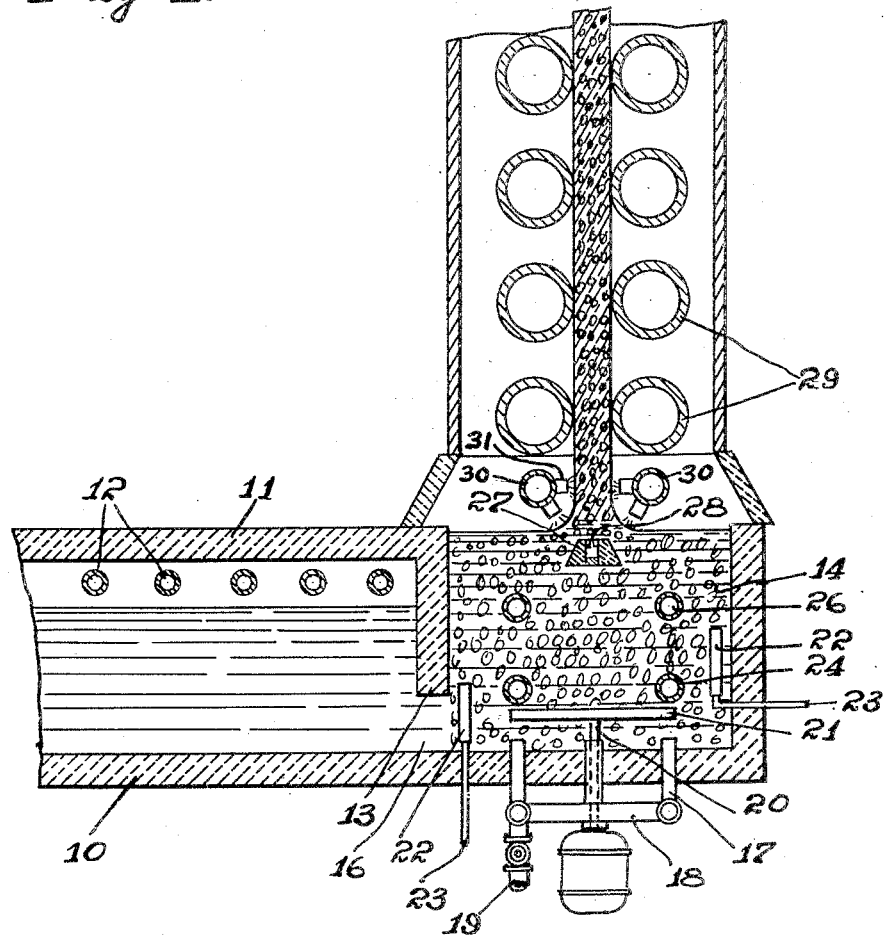

Oct. 28, 1941. J. H. FOX ET AL 2,261,022

MANUFACTURE OF VESICULAR GLASS

Filed Dec. 24, 1937 4 Sheets-Sheet 1

INVENTOR.
JOHN H FOX
WILLIAM. O LYTLE.
BY Bradley & Bee
ATTORNEYS.

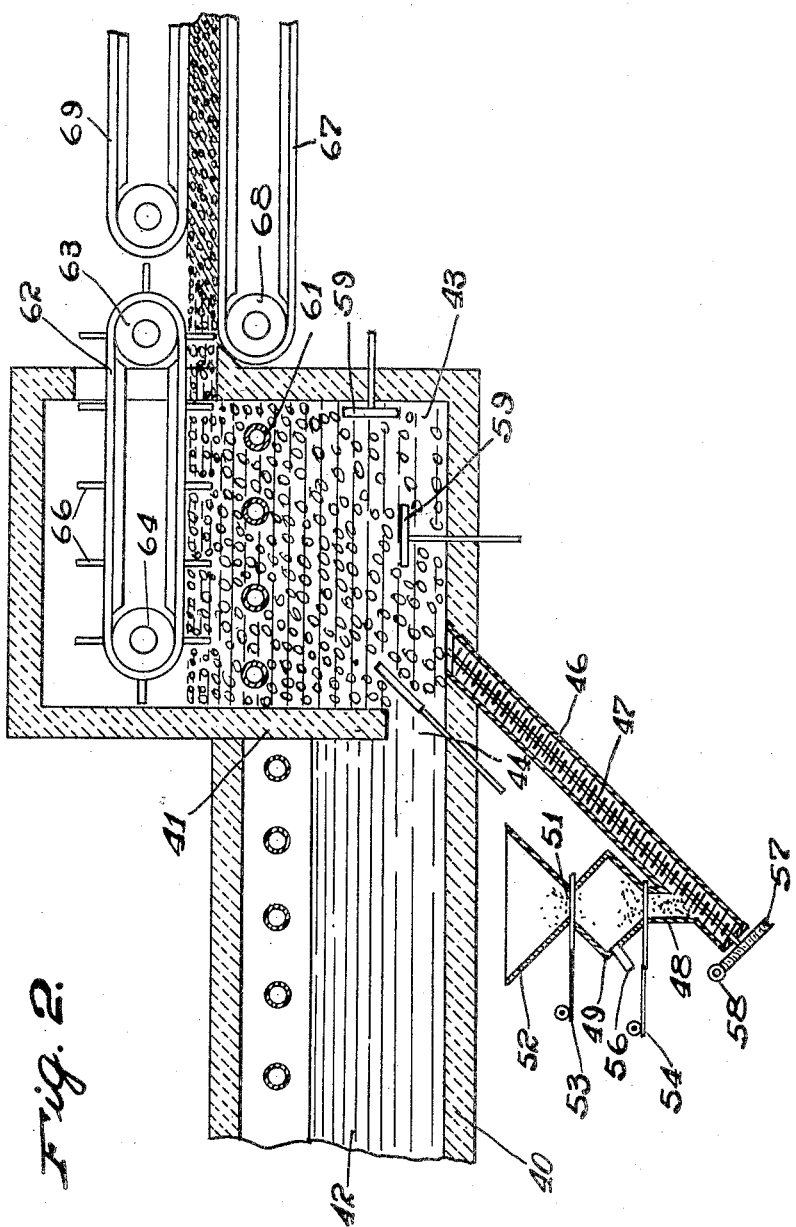

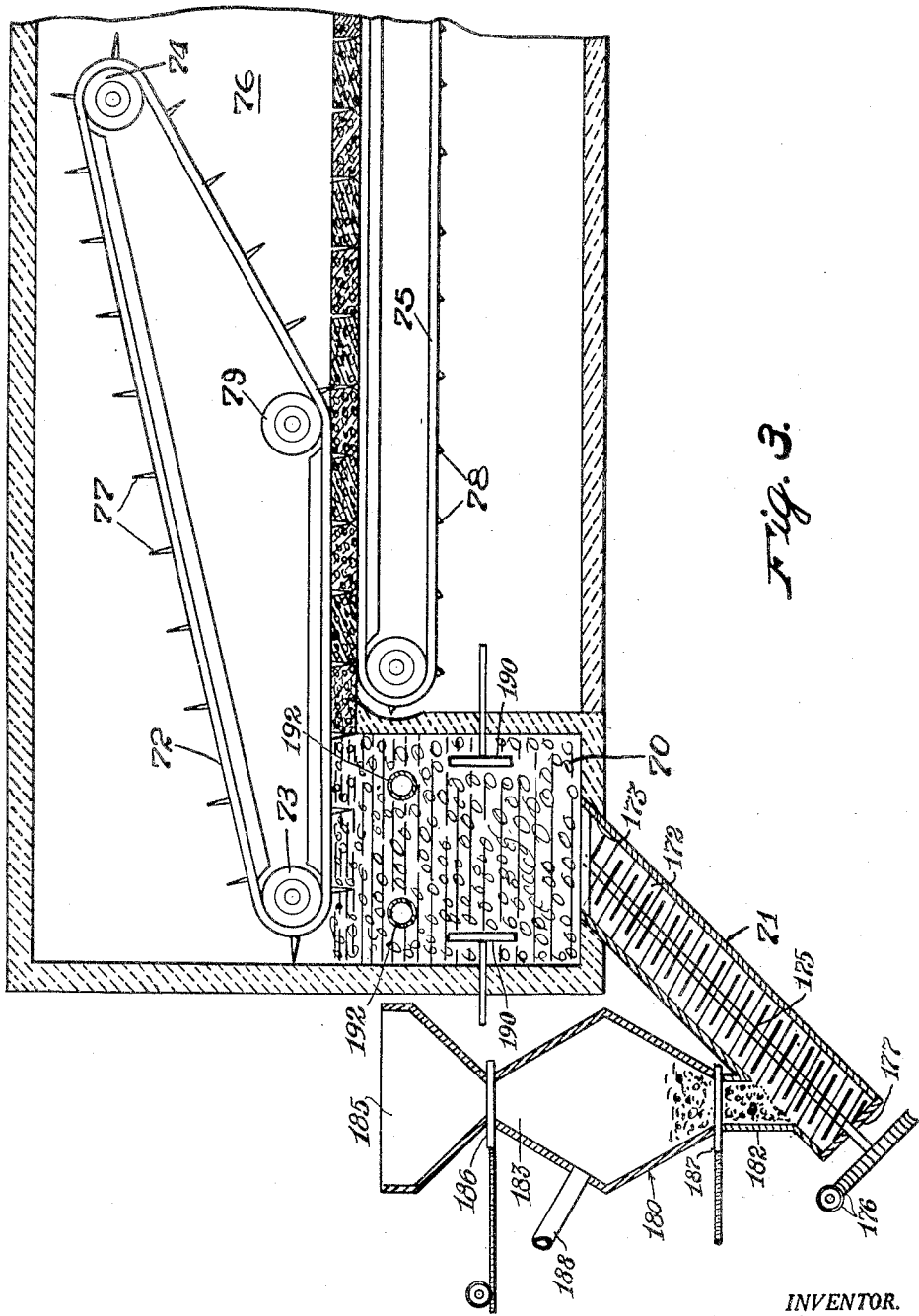

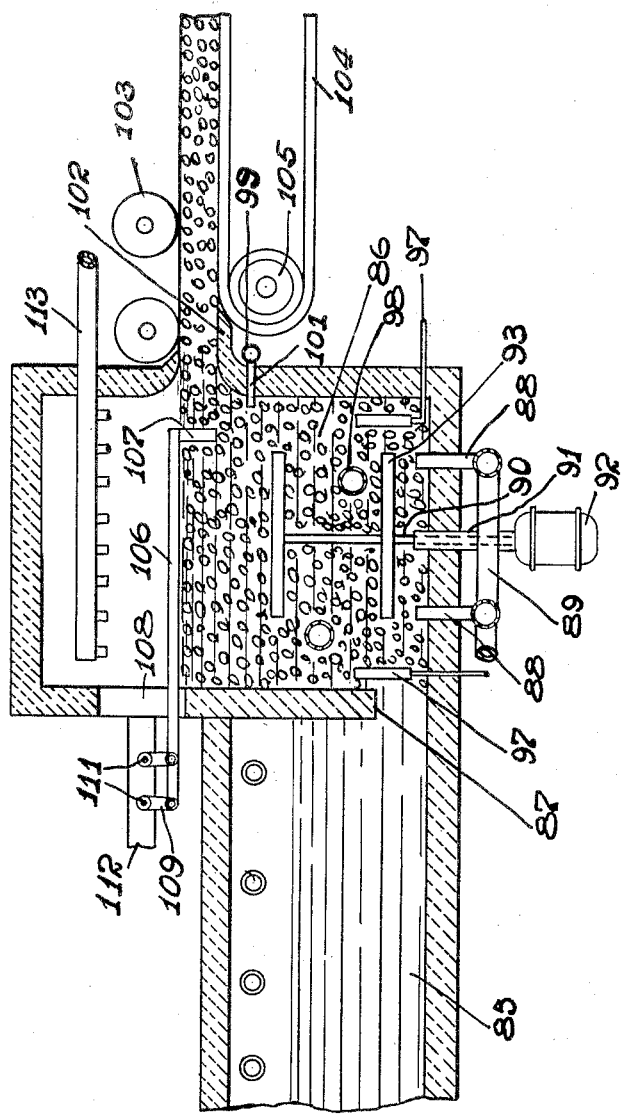

Patented Oct. 28, 1941

2,261,022

UNITED STATES PATENT OFFICE 2,261,022

MANUFACTURE OF VESICULAR GLASS

John H. Fox, Pittsburgh, and William O. Lytle, New Kensington, Pa., assignors to Pittsburgh Plate Glass Company, a corporation of Pennsylvania Application December 24, 1937, Serial No. 181,630

3 Claims. (Cl. 49—83.1)

The present invention relates to the manufacture of glass products and it has particular relation to the manufacture of a porous glass product suitable for use as a means for heat and sound insulation and as a light weight building material.

One object of the invention is to provide a process of manufacturing porous glass in which operation is substantially continuous and involves a minimum expenditure of labor.

This and other objects will be apparent from consideration of the following specification and claims.

It has heretofore been proposed to introduce bubbles of gas into molten glass in order to form a cellular product which is an insulating medium for heat and sound. The conventional method of preparing the product involved the provision of a portion of molten glass containing bubbles of gas or containing a gas-producing material in molds and then allowing the molten or plastic material to expand to fill the mold. Obviously, a substantial amount of labor is involved in such operation which tends to increase the cost of the product.

According to the provisions of the present invention this objection is obviated by forming a foam or froth of molten or plastic glass in a suitable container by any convenient method, for example, by blowing molten glass with air or other gas or by whipping molten glass and then drawing off the froth from the top of the mass as a continuous sheet and then cooling the sheet and cutting it up into blocks or units of suitable size.

Embodiments of apparatus suitable for use in practicing the invention are disclosed in the drawings in which Figure 1 is a cross-sectional view of an apparatus for forming cellular glass and then drawing it vertically as a sheet. Figures 2 and 3 are cross-sectional views of an apparatus for forming molten cellular glass and then drawing it horizontally into sheet form. Figure 4 is a cross-sectional view of a form of apparatus suitable for drawing the cellular product horizontally and simultaneously forming it into blocks. In the drawings like numerals refer to like parts throughout.

In the form of the invention disclosed in Figure 1 a glass tank 10 has a roof or arch 11 and ports 12 for the admission of fuel gases for combustion to melt the glass. It is also provided at its forward end with a downwardly-extending curtain or baffle 13, that separates the tank from the forehearth or drawing compartment 14, and at its lower edge is spaced from the bottom of the tank 10 in order to provide a passage 15 for the flow of molten glass from the tank 10 into the forehearth. Suitable means for converting the molten glass passing from the tank 10 into a froth or foam are provided and may comprise a series of tuyère-like inlet tubes 17 extending upwardly through the bottom of the forehearth 14. These tubes communicate with a tubular manifold 18 which is fed with air, carbon dioxide or other suitable gas by means of a conduit 19. A gas-producing liquid such as water may also be fed through the tube 19, which liquid upon contact with the molten glass in the bottom of the chamber is quickly converted by evaporization or chemical reaction into a gas which forms the bubbles. In order to insure that the bubbles in the glass will be broken up into sufficiently small sizes, a motor driven shaft 20 may extend upwardly through one of the inlet tubes 17 and is provided at its upper extremity with an agitator blade 21. Gases passing up around the shaft prevent escape of molten glass about the shaft and also tend to cool and protect the latter.

For purposes of maintaining the molten glass in the compartment 14 at precisely the desired consistency for drawing into a cellular sheet, suitable means for controlling the temperature may be provided. In the form illustrated, the means for heating the mass comprise a plurality of electrodes 22, adapted to conduct electricity directly into the molten glass, which are joined to conductors 23 extending to a suitable source of electricity (not shown). If preferred these electrodes may be supplemented or even entirely replaced by horizontal fire tubes 24 which may be heated or cooled as required by means of combustion gasses or other gases from a suitable furnace or compressor (not shown). Electrical resistance heating elements may also be enclosed in these tubes if desired. A second set of horizontal tubes 26 are disposed above the electrodes 22 and constitutes means for further heating the molten glass or in event that it is desired to increase the viscosity of the glass adjacent to the surface a cooling medium such as air or the like may be circulated therethrough. In case that heating alone is required these tubes may be replaced or supplemented by electrical resistances or electrodes.

An additional tube 27 placed adjacent to the upper surface of the molten mass preferably is of trapezoidal cross-sectional contour and constitutes a draw-bar for purposes of initiating the forming of the glass sheet. Heat may be supplied to this bar by means of heated gases passing therethrough or by means of suitable electrical resistances (not shown). For purposes of further increasing the porosity of the molten glass passing over the bar, a series of small holes or outlets 28 may be formed in the bar and all or a portion of the gases at suitable temperature introduced as bubbles into the molten mass as it is formed into a sheet.

A series of pairs of spaced rollers 29, driven by suitable means (not shown), are arranged horizontally above the surface of the molten glass in the compartment 14 and constitute means for drawing and rolling the molten glass out into sheet form. If desired, the foamy mass as it emerges from the compartment 14 may be quickly cooled upon its surface in order to increase the viscosity and thus more securely to entrap the bubbles of gas contained therein during the early stages of drawing. Means for accomplishing this function comprises tubes 30 disposed upon the opposite sides of the sheet as it is being formed and having formed therein a series of nozzles 31 through which a cooling medium, such as air, is blown upon the sheet at the point of its formation. The mode of operation of this embodiment of the invention is relatively simple. Molten glass in tank 10 is allowed to flow through the passage 16 into the compartment 14 while a mass or bubble-forming gas is projected thereinto through the inlets 17. The temperature of the bubbly mass is then adjusted at the various levels by means of the heating elements 22 or tubes 24 and 26 in order to insure that it is of correct consistency to maintain the entrapped bubbles of gas uniformly distributed in the mass and also to insure that it can be drawn out into sheet form. Additional gases may be introduced through the conduit-like draw-bar 27. However, this may not in all instances be required. The mass above the draw-bar is then conducted between the rollers 29 which draw it out as a cellular glass sheet, while a cooling gas from conduits 30 may be allowed to play upon the surface thereof.

If desired, the tank 10 for feeding molten glass into the compartment 14 may be eliminated and the compartment simply charged with cullet or with sand, lime and soda in order to form the molten glass in situ in the compartment. The gas for forming the bubbles instead of being introduced through the inlets 17 may also be formed in the mass by chemical decomposition of a gas-forming material such as calcium carbonate or by the combustion of carbonaceous materials under the surface of the glass. These gas-producing materials may be introduced directly into the molten glass or may be admixed with crushed glass or with finely divided glass-forming materials which are then introduced as solid materials into the compartment 14 where the glass or glass-forming materials are melted down into a more or less fluid state and the gas-forming materials are decomposed to generate bubbles in the mass.

Apparatus for drawing sheets of cellular glass horizontally is disclosed in Figure 2 and comprises a tank 40 in which is disposed a baffle or curtain 41 dividing it into a melting tank 42 and a forehearth or drawing chamber 43. Glass in molten state flows from the melting tank through a passage 44 below the lower edge of the baffle 41 into the drawing compartment 43, and may be converted into froth or foam by any suitable means. For purposes of illustration there is shown a feeder mechanism for the introduction of calcium carbonate, vermiculite, or similar gas-producing or gas-containing substances through the bottom of the compartment into the stream of glass as it enters the drawing compartment. This feeder mechanism comprises an inlet conduit 46 extending through the bottom of the compartment 43 and being provided with a screw conveyor 47, for forcing the solid gassing material into the molten glass. The tube is connected at its lower end to the throat 48 of an air lock chamber 49, constituting means for preventing gases generated by decomposition of the calcium carbonate at the bottom of the drawing compartment from escaping through the tube. This chamber is connected by means of a throat 51 with a conventional hopper 52. Slide valves 53 and 54 disposed respectively in the throats 51 and 48 constitute means for maintaining positive pressure in the chamber. Air under compression may be introduced into the chamber by means of a conduit 56 to assist in forming bubbles in the mass and to prevent any tendency of the molten glass to percolate downwardly through the granular material in tube 46. If preferred the latter tendency may be obviated by elevation of the rear end of screw 47 and tube 46 in such manner that the rear ends thereof are above the level of the glass. If desired the foam may be produced entirely by means of a gassing medium such as air, steam, or the like introduced in fluid form through the conduit 56, or if preferred the foaming may be produced solely by means of a solid material such as calcium carbonate which is introduced by the action of a screw 47.

Screw 47 projects at its lower end through a suitable packing (not shown) in the lower extremity of the tube 46 and is driven by any convenient means, for example by means of a worm gear 57 engaging a motor actuated worm 58.

The temperature of the glass in the drawing compartment 43 may be controlled by means of electrical heating devices, by tubes for conducting heating or cooling gases in heat exchange relation with the molten mass, or by any other suitable means. In the drawings are shown a series of electrodes 59, placed at suitable points adjacent to the bottom of the compartment. The temperature of the mass adjacent to the surface is controlled by means of tubes 61 through which a heating or cooling medium may be circulated as required. These tubes may be provided with outlets for the further gasification of the molten mass.

Transverse feeding of the molten material at the surface of the mass for purposes of drawing it out in sheet form is obtained by means of a conveyor or chain 62 composed of relatively refractory material and trained about rollers 63 and 64, the latter of which is rotated by suitable means (not shown). The conveyor is provided at suitable intervals with blades 66 extending outwardly therefrom and projecting along the lower reach of the conveyor below the surface of molten material in the compartment 43. Conveyor 62 extends outwardly over the forward edge of the compartment 43 in proximity to one extremity of a second conveyor 67 which is trained about rollers 68, driven by suitable means (not shown). This conveyor constitutes means for carrying away the vesicular mass of glass as it is forced out of the drawing compartment by the conveyor 62 and preferably extends through an annealing lehr (not shown). A third conveyor 69 is disposed above and in parallelism to the conveyor 67 at a suitable height to press or restrict the foamy mass upon the conveyor 67 to a desired thickness.

In the operation of this embodiment of the invention molten glass is allowed to flow into the drawing compartment 43 from tank 42 and while it is passing through the throat or channel 44 calcium carbonate or other suitable gassing agent is extruded into the stream. The viscous bubbly mass rises in the drawing chamber or forehearth until it is enmeshed between the paddles 66 upon conveyor 62. The latter then forces the surface layer out upon conveyor 67 where it is allowed to solidify and is then annealed and cut up into slabs of convenient dimensions.

In Figure 3 is shown an embodiment of apparatus for forming the vesicular sheet into blocks as it is drawn from the tank or chamber. In this embodiment of apparatus, a suitable melting chamber in the form of a tank or compartment 70, corresponding substantially to the drawing compartment 43 in Figure 2 is provided for receiving the batch which includes the bubble-forming material. Feeding mechanism 71 for supplying the batch to the chamber 70 comprises an inlet conduit 172 which communicates through an opening 173 into the bottom of the chamber 70 and which is provided with a screw conveyor 175 for forcing the ingredients of the mixed batch into the melting chamber. Suitable driving gearing 176 rotates the screw conveyor from the lower end thereof and the lower end of the conduit is provided with a bearing head or end wall 177 which rotatably supports the lower end portion of the screw conveyor.

A hopper 180 has a lower throat portion 182 communicating with the lower end portion of the conduit 172 and has a central air lock chamber 183 communicating at opposite extremities with the lower throat portion 182 and an upper flaring mouth 185 in which the batch material is supplied. Suitable slide valves 186 and 187 disposed at the upper and lower extremities, respectively, of the air lock chamber prevent back pressure from forcing any of the material rearwardly or upwardly through the throat portion 182. These valves can be opened alternately in order that the glass-making ingredients can be received into the chamber 183, and to permit such ingredients to be fed through the throat portion 182 into the conduit 172 from which they are forced into the melting chamber 70.

A conduit 188 communicating with the air lock chamber 183 and with a suitable source (not shown) of fluid or gas under pressure is provided to facilitate the passage of the batch through the conduit 172 into the melting chamber 70 and also to facilitate the forming of a foamy batch in the melting chamber.

The melting of the materials to proper consistency in the chamber 70 is effected by means of electrical heating devices, such as electrodes 190 mounted at suitable locations in an intermediate portion of the chamber. The portion of the batch adjacent its upper surface is controlled by means of heating tubes 192 through which heating or cooling medium can be circulated as required. These tubes can also be provided with outlets inside the melting chamber for further gasification of the molten mass. This arrangement of apparatus is provided with a conveyor 72 trained about suitable driven rollers 73 and 74, the former of which is disposed parallel to and in proximity to the surface of the molten glass and the latter of which is spaced a substantial distance above and in advance of the forward edge of the tank. A conveyor 75 corresponding to the conveyor 67 is disposed below the lower reach of the upper conveyor and these two conveyors preferably extend through a lehr 76 in which the glass is annealed and cooled down to a temperature suitable for handling. These conveyors are respectively provided with cleats or lugs 77 and 78 which coact to cut or mold the sheet of glass into blocks of appropriate size as it is formed. It will be noted that the roller at the forward end of the upper conveyor is spaced a sufficient distance above the lower conveyor to disengage the blades or lugs on the upper conveyor from the blocks before the latter reach the end of travel thereof. The rearward extremity of the upper conveyor is held in proximity to the lower conveyor by means of a roller 79.

The operation of this form of the invention is identical with that of the form disclosed in Figure 2 except that the glass is melted or softened or formed in the drawing chamber and the sheet as it is drawn out and while still plastic is scored or cut into blocks.

A mixture of crushed glass and $CaCO_3$ may be introduced through the hopper mouth 185 and feeding conduit 172 into the melting chamber 70 where the glass melts down and the calcium carbonate decomposes to form bubbles of $CO_2$. If the lime sand and soda ash of the batch are introduced in this way, the $CO_2$ evolved will be entrapped in the molten glass as it seeks to escape upwardly to form the cellular mass without introduction of additional gassing agents. In the event that the cellular body is formed by heating a mixture of crushed glass and calcium carbonate, a glass of the composition of ordinary sheet glass may be employed. It should be so crushed or broken up that it will pass through a 28 mesh screen, but it is retained by a 100 mesh screen. Such material will sinter at about 1300 or 1400° F. and will flow as a pasty plastic mass at a temperature of about 1600 to 1750° F. At higher temperatures it melts down completely. Preferably it is formed or bloated into a cellular mass while in this intermediate, plastic state. Within this temperature range the particles of glass, although they weld together at the points of contact, they do not completely coalesce or flow together. The resultant sheet apparently contains voids resulting from incomplete fusing of the particles and also from liberation of the gas bubbles in the mass. The apparent density of this mass may be varied almost at will, but for most purposes a product having a weight of 14-35 pounds per cubic foot is satisfactory. The material may be easily cut and sawed and can be nailed without breaking.

Of course the cellular mass could be formed under such conditions that the particles will be completely fused together to form a bubbly mass, and such mode of operation is contemplated as being within the scope of the present invention.

In the form of the invention disclosed in Figure 4 a tank 85 is provided with a drawing compartment 86 separated therefrom by a baffle 87 all of which respectively correspond to tank 40, drawing compartment 43 and baffle 41 in the form of the invention disclosed in Figure 2. Molten glass in the drawing compartment is converted into a froth or foam by means of a gas or a gas-forming liquid introduced through inlets 88 which are supplied from a conduit 89. A suitable agitator for thoroughly distributing the bubbles of glass may be provided and includes a shaft 90 which is extended into the tank through a conduit 91 joined to the conduit 89 in such manner that the gas passing upwardly about the shaft functions both to cool it and to prevent molten glass from flowing downwardly about it. The shaft is actuated by a motor 92 at the lower extremity thereof. At its upper extremity it is provided with suitable agitator blades 93. The vesicular mass in the drawing compartment is maintained at a suitable operating temperature by means of electrodes 97 disposed adjacent to the bottom thereof and further by means of tubes 98 for heating or cooling gases disposed at suitable elevations in the tank. Additional gassing medium for further increasing the porosity of the molten glass may be introduced through a conduit 99 having inlets 101 extending through the forward wall of the drawing tank adjacent to the point where the glass is drawn from the tank.

The upper edge of the forward wall of the compartment terminates in a lip 102 designed to discharge the surface portion of the foamy mass of molten glass outwardly under a smoothing or compressing rollers 103 upon a suitable conveyor which may comprise a series of driven rollers or preferably as shown in the drawing a conveyor chain 104 trained about supporting and driving roller 105 and leading to a suitable annealing lehr (not shown).

For purposes of insuring the uniform feed of the molten glass from the drawing compartment to the conveyor 104 a suitable pusher mechanism may be provided. An example of such mechanism includes a horizontal rod 106 which is provided at its forward end with a blade 107 adapted to dip below the surface of the molten mass. This rod projects rearwardly through a slot 108 in the rear wall of the drawing compartment and is supported upon and actuated by a pair of parallel cranks 109 which are secured upon and driven by shafts 111. The shafts in turn are journaled in bearings in a support 112. A blast of air for cooling the surface of the molten glass in the drawing compartment is supplied through a conduit 113 disposed above the rod 106.

The mode of operation of this embodiment of the invention is substantially the same as that of the form disclosed in Figure 2. Molten glass flows from the tank 85 into the drawing compartment 86 and is transformed into a foam by gas or gas-forming liquid such as water which is introduced through the inlets 88 and 91. The temperature of the mass is suitably regulated by means of the electrodes 97 and the tubes 98. The surface of the mass is quickly cooled by means of a blast of air from the conduit 113, in order to render it sufficiently viscous to retain the bubbles. The rotation of the shafts 111 causes the rod 106 to travel downwardly to dip the blade 107 into the surface of the mass and then to travel forwardly to push a portion of the material outwardly over the lip 102 and upon the conveyor 104. Subsequently continued rotation of the shafts causes the pusher rod to rise to lift the blade 107 from the glass and then to retract to the initial drawing position. The foamy mass upon the conveyor 104 is carried forwardly through the annealing lehr for purposes of relieving the internal strains upon the glass.

In any of the embodiments of the invention disclosed in Figures 2, 3 and 4, the devices for expediting the flow of glass from the drawing hearth may be eliminated, and flow of glass out upon the conveyors 67, 75 and 104 obtained by gravity alone and/or by the pull of the conveyor upon the cellular mass. Conveyor rollers arranged at suitable intervals are considered as the equivalents of the continuous conveyors disclosed.

The present process may be employed in the formation of cellular glass weighing up to 75 or 80 pounds per cubic foot.

Although only the preferred forms of the invention have been shown and described, it will be apparent to those skilled in the art that numerous modifications may be made therein without departing from the spirit of the invention or the scope of the appended claims.

What we claim is:

1. The process of forming cellular glass which comprises mixing crushed glass and calcium carbonate, continuously feeding the mixture into a melting chamber, heating the mixture in the chamber until the calcium carbonate decomposes to form bubbles of carbon dioxide and to provide a foamy batch, and drawing off the upper area of the foamy batch and cooling it in the form of a porous body.

2. A process of preparing cellular glass sheets which comprises forming a foam of fluid glass in a chamber, drawing off the foam as a sheet at the top of the chamber, and simultaneously introducing gas bubbles into the foam at the line of draw, and subsequently annealing and cooling the resultant sheet while replenishing the foam from below.

3. A process of forming cellular glass, which comprises heating a mixture of finely crushed glass and a gassing agent to a temperature of about 1600° to 1750° F. to weld the particles of glass together at their points of contact without completely coalescing them, the gassing agent being decomposable at such temperature to liberate bubbles of glass in the mass and thus to bloat it, then drawing off the bloated mass as a continuous sheet and subsequently cooling and annealing the sheet.

JOHN H. FOX.
WILLIAM O. LYTLE.